(12) United States Patent
Tsai et al.

(10) Patent No.: US 9,374,298 B2
(45) Date of Patent: Jun. 21, 2016

(54) GRACE STATE AND PACING IN LINK AGGREGATION

(75) Inventors: Chia Alex Tsai, Cupertino, CA (US); Yuchen Zhou, Petaluma, CA (US); Rajagopalan Janakiraman, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 579 days.

(21) Appl. No.: 13/466,657

(22) Filed: May 8, 2012

(65) Prior Publication Data

US 2013/0301427 A1    Nov. 14, 2013

(51) Int. Cl.
H04L 12/709    (2013.01)
H04L 12/703    (2013.01)

(52) U.S. Cl.
CPC .............. H04L 45/245 (2013.01); H04L 45/28 (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 6,163,543 A | 12/2000 | Chin et al. | |
| 7,274,694 B1 | 9/2007 | Cheng et al. | |
| 7,602,726 B1 * | 10/2009 | Sundaresan et al. | 370/237 |
| 7,729,361 B2 | 6/2010 | Ma et al. | |
| 7,808,927 B2 | 10/2010 | Retana et al. | |
| 7,876,764 B2 | 1/2011 | Binetti et al. | |
| 7,940,661 B2 | 5/2011 | Ervin et al. | |
| 2006/0039384 A1 | 2/2006 | Dontu et al. | |
| 2007/0183313 A1 | 8/2007 | Narayanan et al. | |
| 2007/0201380 A1 | 8/2007 | Ma et al. | |
| 2009/0285225 A1 * | 11/2009 | Dahod | 370/401 |
| 2013/0157613 A1 * | 6/2013 | Limber et al. | 455/405 |

OTHER PUBLICATIONS

International Search Report and Written Opinion for PCT/US2013/038614 mailed Jul. 19, 2013.
Finn, Norman, "Port Aggregation Protocol," Cisco Systems, Inc., May 1, 1998, pp. 1-27.
"IEEE Standard for Local and Metropolitan Area Networks—Link Aggregation: 802.1AX™—2008," IEEE Computer Society, Nov. 3, 2008, pp. 1-163.
"Configuring Fast EtherChannel and Gigabit EtherChannel," Cisco Systems, Inc., Apr. 5, 2007, pp. 1-16.
"Configuring mLACP for Server Access," Cisco Systems, Inc., Apr. 24, 2012, pp. 1-26.
"IEEE 802.3ad Link Bundling," Cisco Systems, Inc., Dec. 4, 2006, pp. 1-40.

* cited by examiner

*Primary Examiner* — Hassan Phillips
*Assistant Examiner* — Omeed D Rahgozar
(74) *Attorney, Agent, or Firm* — Polsinelli PC

(57) ABSTRACT

In one embodiment, one or more indicia of stress are monitored. Based on the one or more indicia of stress, it is determined a stress condition exists. In response to the stress condition, one or more link aggregation actors and partners are caused to enter a grace state for a grace period. While the one or more link aggregation actors and partners are in the grace state, link aggregation formation is paced on a plurality of links by delaying formation of one or more new link aggregation groups on the plurality of links until a hold is released. Upon expiration of the grace period, the grace state is exited.

16 Claims, 5 Drawing Sheets

GRACE STATE AND PACING IN LINK AGGREGATION

TECHNICAL FIELD

The present disclosure relates generally to computer networks, and, more particularly, to link aggregation in computer networks.

BACKGROUND

While some network devices may be called upon to support only a handful of link aggregation groups, others may be called upon to support hundreds, thousands, or even tens of thousands of link aggregation groups. Such configurations may be particularly susceptible to disruption due to stress conditions. For example, in such configurations, a system reload, or a control switchover, may cause a larger number of link aggregation groups to be formed, or reconfigured, within a short period of time, causing extreme stress. Similarly, in such configurations, control plane congestion may cause an excessive number of protocol data units (PDUs) to be lost, again causing stress.

Current link aggregation techniques often poorly cope with stress conditions. Often, the result is continuous link aggregation flapping, where a link aggregation group is repeatedly formed, then fails, then formed, then fails, over and over again. Link aggregation flapping, when it occurs, becomes a source of additional stress, compounding the underlying problem. Sometimes, the result is a complete failure of link aggregations to form.

BRIEF DESCRIPTION OF THE DRAWINGS

The embodiments described herein may be better understood by referring to the accompanying drawings in which like reference numerals indicate identically or functionally similar elements, of which.

DESCRIPTION OF EXAMPLE EMBODIMENTS

Overview

Figure 1:
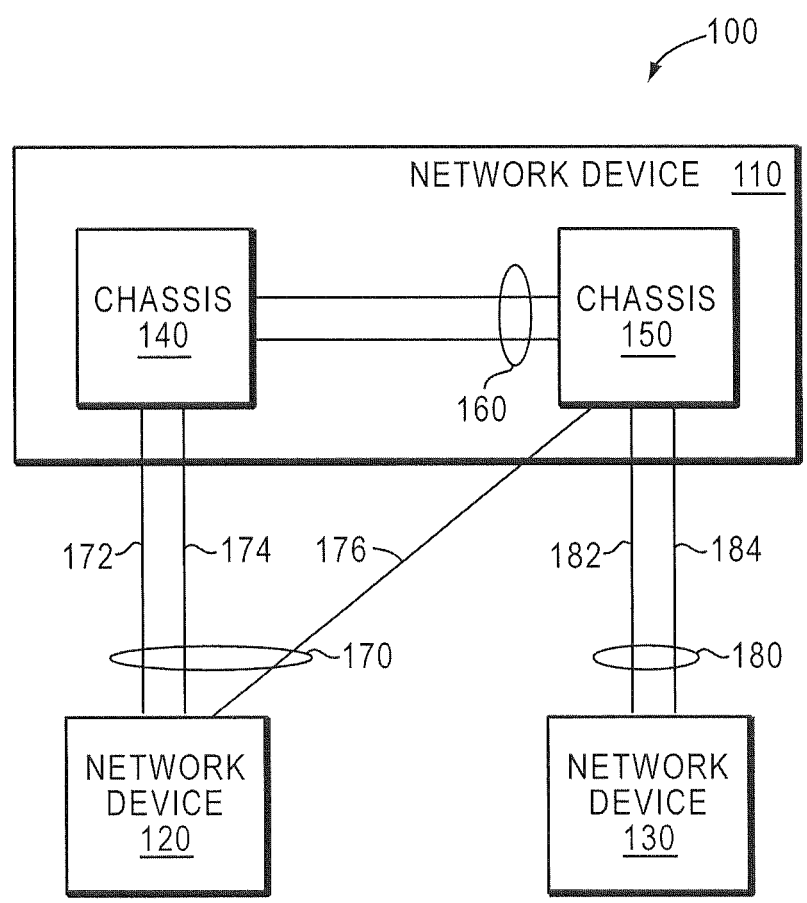
FIG. 1 is a schematic block diagram of an example computer network which may be used with the embodiments disclosed herein.

According to embodiments of the disclosure, the effects of stress conditions on link aggregations may be reduced by use of a grace state. One or more indicia of stress are monitored, and, based on the one or more indicia of stress, it is determined a stress condition exists. In response to the stress condition, one or more link aggregation actors and partners are caused to enter a grace state for a grace period. While the one or more link aggregation actors and partners are in the grace state, link aggregation formation is paced on a plurality of links by delaying formation of one or more new link aggregation groups on the plurality of links until a hold is released. Upon expiration of the grace period, the grace state is exited.

Description

A computer network is a geographically distributed collection of physical links (e.g., Ethernet cabling, fiber optic connections, etc.), used to transport data between network device (e.g., switches, routers, computers, etc.). Many types of computer networks are available, including local area networks (LANs) and wide area networks (WANs). The network devices of a computer network typically communicate by exchanging discrete packets or messages according to predefined protocols. In this context, a protocol consists of a set of rules defining how network devices interact and/or interoperate with each other.

Many computer networks use some form of link aggregation to increase bandwidth and/or reliability. In link aggregation, multiple links between network devices are grouped (logically combined) to form a logical link that offers increased bandwidth and/or reliability. A control protocol is typically executed to facilitate link aggregation. Common link aggregation control protocols include Link Aggregation Control Protocol (LACP) standardized in Electrical and Electronics Engineers (IEEE) 802.1AX and Port Aggregation Protocol (PAgP) developed by Cisco Systems, Inc., however a variety of other link aggregation control protocols exist.

Link aggregation control protocols typically perform a number of tasks in order to support link aggregations. These tasks include checking if candidate links can actually be aggregated, creating new link aggregation groups, controlling the addition of links to existing link aggregation groups, monitoring the status of the aggregated links to ensure their membership in a link aggregation group is still valid, removing links from link aggregation groups if their membership is no longer valid, and removing link aggregation groups if they have an insufficient number of (e.g., 0) remaining member links.

In order to perform these and other tasks, link aggregation control protocols typically cause the network devices at opposing ends of link aggregations to exchange messages, such as protocol data units (PDUs). Depending on the link aggregation control protocol being used, these PDUs may take a variety of different forms. For example, in 802.1AX LACP, these PDUs may take the form of Link Aggregation Control PDUs (LACPDUs). Similarly, in PAgP, these PDUs may take the form of PAgP PDUs.

Further, in order to perform these and other tasks, link aggregation control protocols typically maintain a number of state machines. Depending on the link aggregation control protocol being used, the state machines may take a variety of different forms. For example, in 802.1AX LACP, these state machines may include a Receive Machine that maintains partner information obtained from PDUs received from the partner, a Periodic Transmission Machine that regulates periodic exchanges of PDUs, a Mux Machine that attaches physical ports coupled to links to an aggregate port to enable a link aggregation, as well as a number of other state machines. Similarly, in PAgP, a number of different well-known state machines are utilized.

While some network devices may be called upon to support only a handful of link aggregation groups, others may be called upon to support hundreds, thousands, or even tens of thousands of link aggregation groups. For example, virtual switching systems (VSS) and multi-chassis LACP (mLACP) server access configurations often include multiple physical chassis that are tasked with handling hundreds of link aggregation groups whose member links are distributed across the chassis. Further, massively scaled datacenter switches, that include multiple interconnected physical chassis, may be tasked with handling thousands or tens of thousand of link aggregation groups, whose member links are again distributed across the chassis.

FIG. 1 is a schematic block diagram of an example computer network 100 which may be used with the embodiments disclosed herein. The computer network 100 may include a plurality of interconnected network devices 110, 120, 130 coupled by links, at least some of which are aggregated into link aggregation groups. Each network device may be a single-chassis network device. However, in one embodiment, a network device 110 is a VSS, mLACP configuration, or datacenter switch that pools multiple physical switch chassis 140, 150. An interconnect 160, such as a virtual switch link (VSL) or other interconnect that includes an aggregation of links, may couple the individual chassis 140, 150. The multi-chassis network device 110 may be coupled to other network devices 120, 130 by a plurality of links that, for example, extend from different chassis 140, 150. Various link aggregation groups may be formed to logically combine ones of the links. For instance, a first set of links 172, 174 and 176 may be placed in a first link aggregation group 170 to form a first logical link, while a second set of links 182,184 may be placed in a second link aggregation group 180 to form a second logical link. The links of a particular link aggregation group may be distributed among the various chassis of a multi-chassis network device. For example, the first link aggregation group 170 may include one or more links 172, 174 from one chassis 140, and one or more links 176 from another chassis 150. While only a small number of links and link aggregation groups are depicted in FIG. 1, it should be understood that typically configurations generally include a far larger number of links and link aggregation groups.

Figure 2:
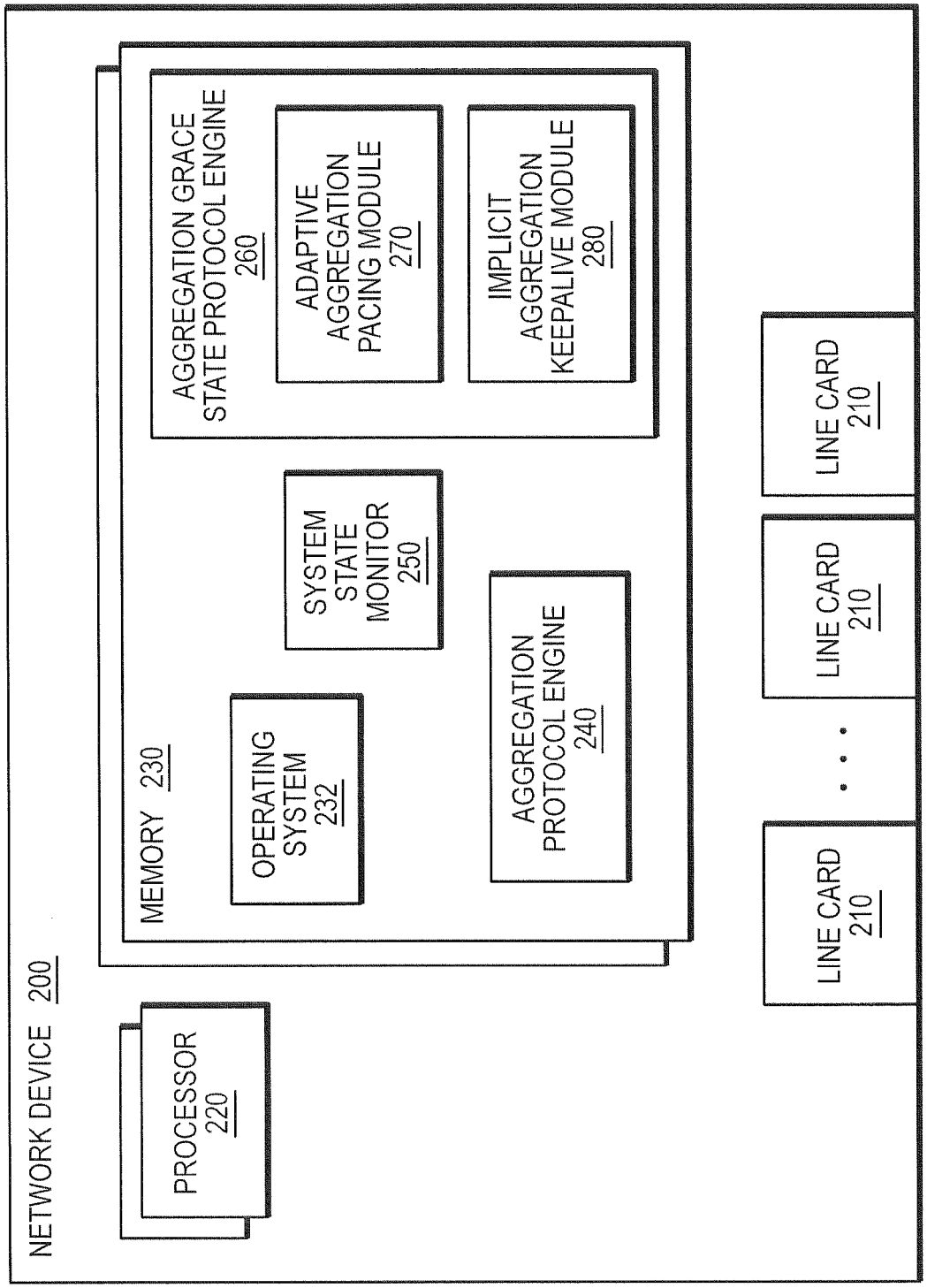
FIG. 2 is a schematic block diagram of an example network device which may be used with the embodiments disclosed herein.

FIG. 2 is a schematic block diagram of an example network device 200 which may be used with the embodiments disclosed herein. The network device 200 may be an example of any of network devices 110, 120 130, shown in FIG. 1. Should network device 200 represent a multi-chassis network device, it should be understood that the components of network device 200 may be distributed across multiple separate physical chassis, rather than be located in a single chassis. In such case, the grouping of components in FIG. 2 should be interpreted as a logical grouping, rather than an indication that the components are physically located within one chassis.

The network device 200 may include a plurality of line cards 210, one or more processors (e.g., CPU(s), microcontrollers, etc.) 220, and one or more memories 230 (e.g., random access memories (RAMs), magnetic storage devices, etc.), among other components. Each line card 210 may contain the mechanical, electrical, and signaling circuitry necessary to support one or more physical ports coupled to links. The one or more memories 230 may include a plurality of storage locations for storing software and data structures, including software and data structures storing data used to implement at least some of the techniques disclose herein. The one or more processors 220 may include logic configured to execute the software and manipulate data from the data structures. While not shown in FIG. 2, at least some of the software and data may be temporarily stored in registers of the processors 220 in conjunction with their operation.

An operating system 232, portions of which are resident in the memories 230 and executed by the processors 220, functionally organizes the network device 200. The operating system 232 may be a version of Cisco Internetwork Operating System (IOS), or other suitable operating system. An aggregation protocol engine 240 may interact with the operating system 232 to implement link aggregation control functionality on the network device 200. On one end of a link aggregation, the aggregation protocol engine may operate as an actor aggregation protocol engine with respect to the link aggregation. In such cases, it may be referred to as a "link aggregation actor". A link aggregation actor may interact with a partner aggregation protocol engine executing at the opposing end of the link aggregation (or simply a "link aggregation partner"), for example, exchanging PDUs therewith. When a new link aggregation group is forming (i.e., aggregating), PDUs may be used to bring the group online. When the link aggregation group is formed (i.e., aggregated), the PDUs may be used to confirm the aggregation's continuing operation and state. PDUs may be exchanged on a periodic basis, their transmission triggered by a periodic timer. Periodic PDUs may be expected to be received before a timeout time has expired.

A number of conditions may occur that prevent the timely formation or proper maintenance of a link aggregation group. Such conditions may be particularly problematic in configurations where the number of aggregations is scaled into the hundreds, thousands, or tens of thousands. For example, in such configurations, a control plane restart (e.g., a hardware or software maintenance or upgrade), a control plane switchover (e.g., a VSS or mLACP chassis failover), or an aggregation protocol engine restart may cause a larger number of link aggregation groups to be formed, or reconfigured, within a short period of time, causing extreme stress. Similarly, in such configurations, processor (e.g., CPU) congestion, control path congestion (e.g., due to an ill-behaved peer, a denial of service (DoS) attack, etc.), or other conditions, may cause an excessive number of PDUs to be lost, again causing stress.

Current link aggregation techniques often poorly cope with stress conditions, such as those described above. Such link aggregation techniques may continue to try to rapidly form (or reform) link aggregations, despite the stress. Often, attempts to form the link aggregation groups fail. Sometimes, the groups may be formed briefly, but soon fail thereafter, in a condition known as link aggregation flapping. In link aggregation flapping, a link aggregation group may repeatedly be formed, then fail, be formed, then fail, over and over again. The messages sent in these attempts to form link aggregation groups often becomes a source of additional stress, compounding the underlying problem.

As explained below, a system state monitor 250 working in conjunction with an aggregation grace state protocol engine 260 may implement a novel technique for reducing the effects of stress conditions on link aggregations. In response to a control signal from the system state monitor 250 indicating detected stress, a grace state protocol engine 260 may cause one or more link aggregation actors and partners to enter a novel grace state. While in the grace state, link aggregation group formation may be paced by a adaptive aggregation pacing module 270, such that formation of link aggregation groups is delayed until a hold is released on the links which are to form the aggregation. Under the direction of a pacing master, the hold may be periodically released on subsets of links (batches) of a selected size, to allow new link aggregations to form on those links. Pacing may increase the chance of successful aggregation formation when there are limited resources, and reduce stress caused by unsuccessful attempts at group formation. Furthermore, while link aggregation actors and partners are in the grace state, existing link aggregation groups may be maintained by implicit keepalive signals from an implicit aggregation keep alive module 280, which sustains the link aggregation groups in lieu of receipt of periodic PDUs. The implicit keepalive signals may be generated when one or more test conditions are met. Use of an implicit keepalive mechanism may prevent link aggregation groups from failing when stress is occurring, minimizing the need to reform failed link aggregations.

The system state monitor 250 may detect a stress condition in response to a number of different indicia of stress. In one embodiment, the system state monitor 250 may detect a stress condition by monitoring for processor (e.g., CPU) starvation at the network device 200. Processor starvation may, for example, be detected based on an examination of the length of a queue of the link aggregation engine, a dequeue rate of the queue, processor usage of the link aggregation engine, and/or other information. In another embodiment, the system state monitor 250 may detect a stress condition by monitoring for a control plane restart or switchover at the network device 200. A control plane restart or switchover may be detected based on one or more signals provided by a high-availability (HA) process (not shown) executing on the network device 200. In another embodiment, the system state monitor 250 may detect a stress condition by monitoring for a link aggregation engine restart, or full system restart. Certain restarts may be detected based on a restart signal provided from a system root process (not shown) executing on the network device 200. In still another embodiment, the system state monitor 250 may detect a stress condition based an indication of control path congestion on the network device 200. The indication of control path congestion may be a length of an inband queue exceeding a threshold, or other change detectable at the network device. In yet other embodiments, other system state information may be used as indicia of stress, in addition to, or in conjunction with, or in place of, the above discussed example indicia.

In response to one or more indicia of stress, the system state monitor 250 may provide a control signal to the grace state protocol engine 260 indicating stress has been detected. For a link aggregation actor, the grace state protocol engine 260 may cause it to directly enter a grace state. Further, the grace state protocol engine 260 may trigger the link aggregation engine 240 to send PDUs with grace state information to a link aggregation partner to cause it to enter a grace state as well. The PDUs with grace state information may be sent over a high priority channel (e.g., an IEEE 802.1Qbb priority-based flow control channel) that is unlikely to be seriously impacted by the stress condition.

The grace state may be associated with a grace period (e.g., a predetermined number of seconds). The grace period may be based on the amount of time it is estimated the stress condition will last. Before expiration of the grace period, an additional grace period may be requested, for example, should the stress condition not have eased as expected. Similarly, should the stress condition ease earlier than expected, the grace state may be exited prior to expiration of the grace period.

Figure 3:
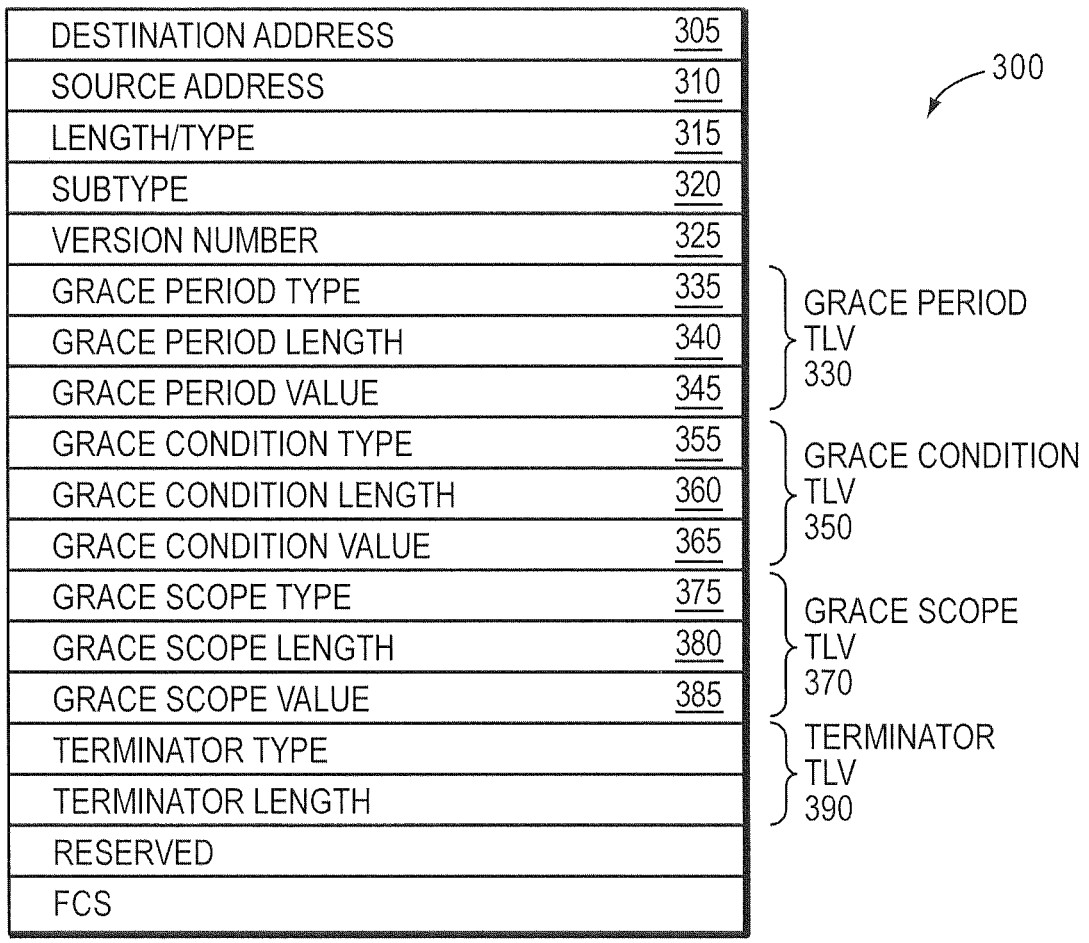
FIG. 3 is an example PDU that includes grace state information.

FIG. 3 is an example PDU 300 that includes grace state information. The PDU may be propagated out of any active member link of a link aggregation group. While in this example, the PDU 300 is a LACPDU used by 802.1AX LACP, it should be understood that other formats of PDUs may be employed with other link aggregation control protocols, for example, with PAgP. The PDU 300 includes a number of fields whose functions are well known, including a destination address field 305, a source address field 310, a length/type field 315, a subtype field 320 and a version number field 320. The value in the version number field may be updated to a new version number. The PDU 300 may also include a one or more (e.g., 3) new type-length-value elements (TLVs), that signal to a link aggregation partner that a link aggregation actor has entered a grace state, the grace period being used, the nature and/or severity of the stress condition, and a grace scope that indicates an extent to which the PDU is applicable.

In one implementation, a grace period TLV 330 may include a type field 335 indicating a grace period type (e.g., identified by a value 0x03), a length field 340 indicating a length of the grace period TLV 330 (e.g., 2 octets), and a value field 345 indicating a value the grace period (e.g., in seconds). A predetermined value of the grace period (e.g., 0 seconds) may signify a request to exit the grace state. Further, a grace condition TLV 350 may include a type field 355 indicating a grace condition type (e.g., identified by a value 0x04), a length field 360 indicating a length of the grace condition TLV 350 (e.g., 2 octets), and a value field 365 providing an indication of the nature and/or severity of the stress condition. For example, a first code may indicate the stress condition is due to processor starvation, a link aggregation engine restart, a control plane restart, a control plane switch over, a system restart, etc. A second code may indicate a severity level (e.g., level 1 to level 256) of the stress condition. Still further, a grace scope TLV 370 may include a type field 375 indicating a grace scope type (e.g., identified by a value 0x05), a length field 380 indicating a length of the grace scope TLV 370 (e.g., 1 octet), and a value field 385 providing an indication of an extent to which the PDU is applicable. For example, a code may indicate a grace scope of an individual link, a link aggregation group, or all link aggregation groups (i.e., global scope). Depending on the grace scope indicated, the receiving link aggregation partner may take different actions. For example, if the grace scope is of a link aggregation group, the link aggregation partner may cause the link aggregation group of the link on which the PDU 300 was received to be subject to the grace state. Similarly, if the grace scope is all link aggregation groups, the link aggregation partner may cause all link aggregation groups to be subject to the grace state. The PDU 300 may also include one or more other TLVs, such as a terminator TLV 390, as well as other fields.

When the grace state is being utilized, the adaptive aggregation pacing module 270 may pace formation of new link aggregations. Such pacing may be coordinated between network devices at opposing ends of link aggregations by election of a pacing master. Should only one network device detect a stress condition, that device will be elected as the pacing master. Should multiple network devices detect a stress condition, a tie breaking mechanism may be employed, for example, based on comparison of system identifiers (IDs), with the network device with the lower system ID being elected as pacing master. It should be understood that a variety of other algorithms may alternatively be employed to elect a pacing master.

The adaptive aggregation pacing module 270 of the pacing master may cause the periodic release of subsets of links (i.e., batches) of a selected size, to allow new link aggregations to form on those links. For example, the adaptive aggregation pacing module 270 may cause the link aggregation engine 240 to transmit a PDU 300 with a grace scope of a link (e.g., including a grace scope TLV 370 with a type field 385 including a code for a scope of a link) on a subset of links, to indicate that a new link aggregation involving those links should be allowed to form. The size of a batch may depend on the stress condition (e.g., as indicated in the first code of the value field 365 of the grace condition TLV 350) and its severity (e.g., as indicated the second code of the value field 365 of the grace condition TLV 350). In general, when a stress condition is severe, batch size may be small. When a stress condition has eased, batch size may be increased. The exact batch size may be determined by any of a wide variety of algorithms, depending on the specific implementation. Similarly, the exact membership of each batch may be determined by any of a wide variety of algorithms, which look to various criteria (e.g., port priorities or other criteria), depending on the specific implementation.

Should the stress condition ease sufficiently before expiration of the grace period, the grace state may be exited early. This may be performed, in part, by transmission of a PDU 300 with a global grace scope (e.g., including a grace scope TLV 370 with a type field 385 including a code of all link aggregation groups) and indicating the grace state should be exited (e.g., including a grace period TLV 330 with a value field 345 indicating a value the 0 seconds).

In addition to pacing formation of new link aggregations, in some implementations while the grace state is in effect existing link aggregation groups may be maintained by implicit keepalive signals from an implicit aggregation keepalive module 280. Use of an implicit keepalive mechanism may prevent link aggregation groups from failing when stress is occurring, minimizing the need to reform failed link aggregations. During a stress condition, a control plane of the network device may be impacted. In such case, proper transmission of periodic PDUs may be delayed or proper reception of periodic PDUs may be prevented. However, the data plane still be operating normally. Accordingly, provided one or more test conditions are met that indicate it is likely that a delay or loss of periodic PDUs is due to a control plane problem (rather than a data plane problem) link the aggregation groups may be implicitly maintained.

In one embodiment, a test condition may be receipt of an explicit indication of a control plane issue. For example, the test condition may be receipt of a PDU from a link aggregation partner indicating a control plane restart or a control plane switchover. In such case, it may be assumed any a failure of the link aggregation partner to periodically transmit PDUs is due to the control plane issue, yet the data plane is likely still operating normally.

In another embodiment, a test condition may be receipt of one or more messages (e.g., other PDUs, for instance, Cisco Discover Protocol (CPD) PDUs) on a link for which periodic PDUs are not being received from a link aggregation partner. In such case, it may be assumed that a failure of the link aggregation partner to periodically transmit PDUs is due an issue with the partner's link aggregation engine, but that the data plane is likely still operating normally. For example, the link aggregation engine may be experiencing processor starvation, or be slowed by one or more dependent components, and therefore unable to transmit or receive PDUs at the required periodic intervals. However, the data plane may still be operating normally.

In another embodiment, a test condition may be occurrence of an overflow of a system inband receiving queue, or a receiving queue of a link aggregation engine. In such case, it may be assumed that the issue with receipt of periodic PDUs is due to their being dropped due to the overflow condition, rather than to a data plane issue.

When one or more test conditions are met, the aggregation keepalive module 280 may provide implicit keepalive signals to the aggregation protocol engine 240 which cause the aggregation protocol engine 240 to maintain link aggregations despite a lack of receipt of periodic PDUs. While periodic PDUs still be transmitted and/or received, when implicit keepalive signals are present, expiration of a timeout period without receipt of a periodic PDU will not trigger a link aggregation failure. The generation of implicit keepalive signals may occur for the duration of the grace period.

The above discussed techniques may be rendered backwards compatible with existing link aggregation protocols. Various checks may be performed to provide backwards compatibility. In one embodiment, a network device may examine a version number (e.g., in version number field 320) in a received PDU to determine whether the transmitting device supports the above discussed techniques. Alternatively, a check of the contents of a received PDU may be performed, for example, to search for one or more of the TLVs (e.g., the grace period TLV 330, grace condition TLV 350, grace scope TLV 370) discussed above. When the above discussed techniques are supported at one end of a link aggregation, the opposing end of a link aggregation, even if it should be able to support them, may forgo their use.

Figure 4:
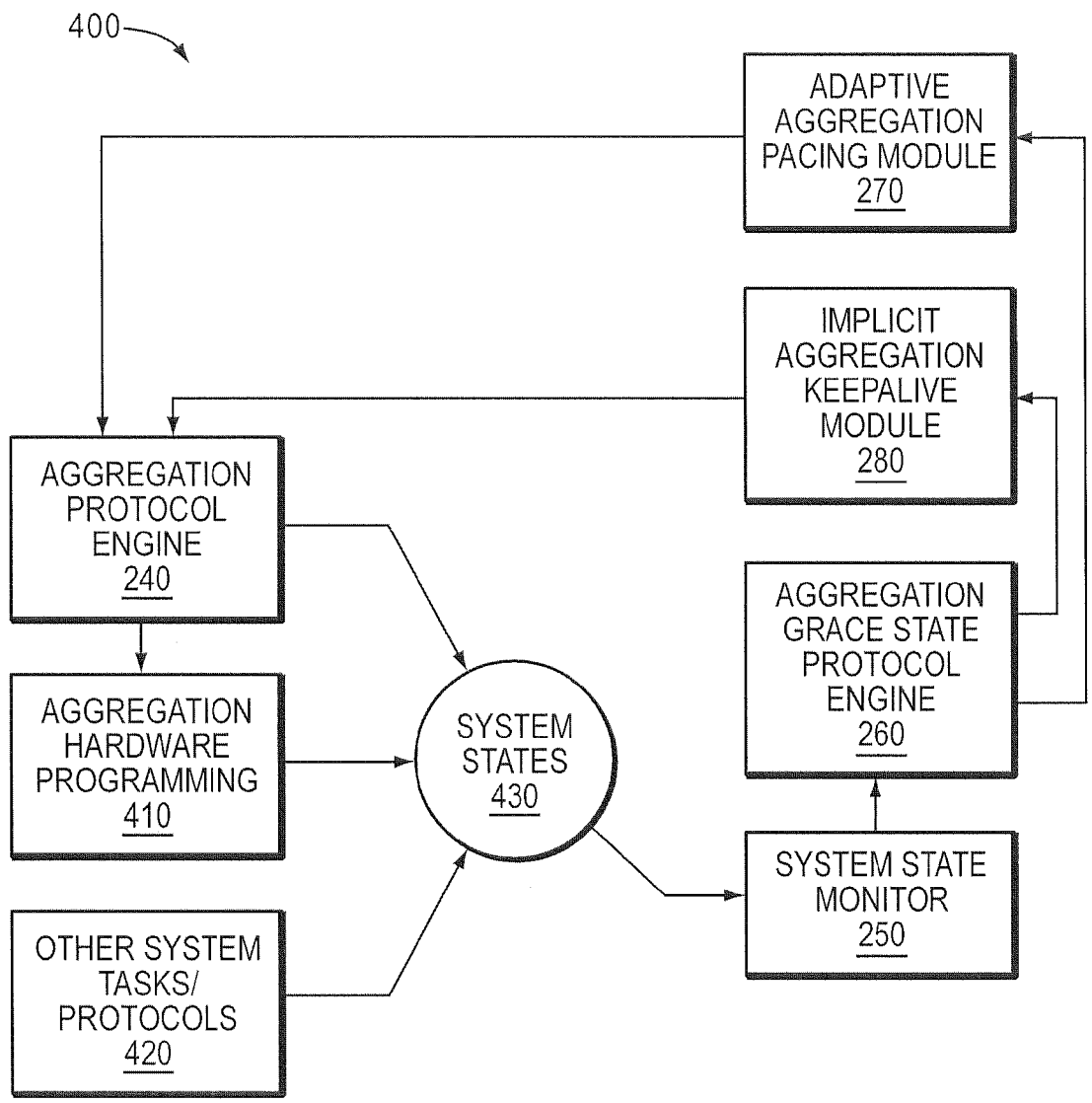
FIG. 4 is a diagram of an example control loop implemented by certain of the embodiments discussed above.

The above discussed operations to minimize the effects of stress conditions on link aggregations may be envisioned as a responsive control loop. FIG. 4 is a diagram 400 of an example control loop implemented by certain of the embodiments discussed above. Operation of an aggregation protocol engine 240, programming of hardware used in link aggregation 410, and other systems tasks and protocols 420, may cause changes in system states 430, which are detected by the system state monitor 250. In response to a control signal from the system state monitor 250 indicating detected stress, the grace state protocol engine 260 may cause one or more link aggregation actors and partners to enter a grace state. This may trigger the adaptive aggregation pacing module 270 to delay formation of certain link aggregation groups until a hold is released on the links which are to form the aggregations, and the implicit aggregation keep alive module 280 to sustain link aggregation groups with implicit keepalive signals in lieu of receipt of periodic PDUs. This in turn effects the operation of the aggregation protocol engine 240, the programming of hardware 410, and ultimately the system states 430, forming a control loop.

Figure 5:
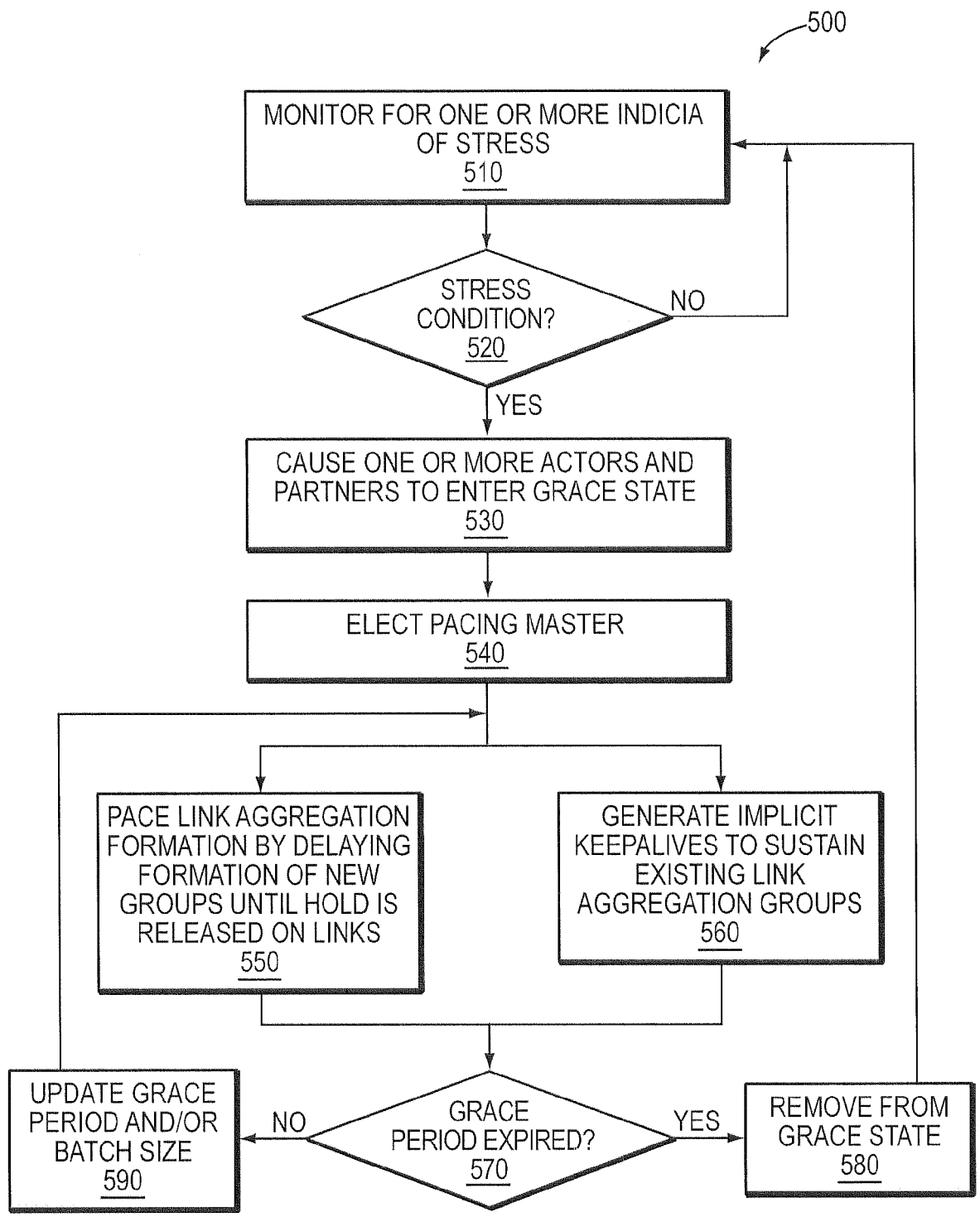
FIG. 5 is a flow diagram of an example sequence of steps for reducing the effects of stress conditions on link aggregations by use of a grace state.

The above discussed operations may also be represented by a flow diagram. FIG. 5 is a flow diagram of an example sequence of steps 500 for reducing the effects of stress conditions on link aggregations by use of a grace state. Initially, at step 510, the system state monitor 250 may monitor for one or more indicia of stress. At step, 520, the system state monitor 250 determines whether there is a stress condition. If not, execution may proceed back to step 510. If so, execution may proceed to step 530, where the grace state protocol engine 260 causes one or more link aggregation actors and partners to enter a grace state. At step 540, a pacing master is elected. At step 550, the adaptive aggregation pacing module 270, under the direction of the pacing master, may delay formation of new link aggregation groups until a hold is released on the links which are to form the aggregations. As discussed above, the hold may be released in batches of selected sizes. Furthermore, at parallel step 560, the implicit aggregation keepalive module 280 may generate implicit keepalive signals when one or more test conditions are met. As discussed above, the implicit keepalive signals may sustain link aggregation groups in lieu of receipt of periodic PDUs. At step 570, the system state monitor 250 determines whether the grace period has expired. If the grace period has expired, execution proceeds to step 580, where all link aggregations are removed from the grace state, and then proceeds back to step 510 where indicia of stress are again monitored. If the grace period has not expired, execution proceeds to step 590 where the grace period and/or batch sizes may be updated. For example, the grace period may be extended by an additional grace period if the stress condition has not ease as quickly as expected, or may be reduced (e.g., to zero) should the stress condition have eased faster than expected. Likewise, the batch size may be increased when the stress condition becomes less sever, and increased should its severity increase. Such changes may be based on a further monitoring of indicia of stress (not shown). Execution may then proceed back to parallel steps 550 and 560.

The above described embodiments reduce the effects of stress conditions on link aggregations by use of a grace state. It should be understood that various adaptations and modifications may be made within the spirit and scope of the embodiments. For example the above-described embodiments may be implemented in software, in hardware, or a combination thereof. A software implementation may include processor-executable instructions stored in one or more non-transitory computer-readable media, such as a volatile or persistent memory, a hard-disk, a compact disk (CD), or other media. A hardware implementation may include configured processors, logic circuits, application specific integrated circuits, and/or other types of hardware components. Further, a combined software/hardware implementation may include both processor-executable instructions stored in a non-transitory computer-readable media, as well as one or more hardware components, for example, processors, memories, etc. Accordingly, it should be understood that the above descriptions are meant to be taken only by way of example. It is the object of the appended claims to cover all such variations and modifications as come within the true spirit and scope of the embodiments herein.

What is claimed is:

1. A method comprising:
   monitoring, by a network device, for one or more indicia of stress;
   determining, based on the one or more indicia of stress, a stress condition exists;
   in response to the stress condition, causing one or more link aggregation actors and partners to enter a grace state for a grace period, the one or more link aggregation actors and partners logically aggregate links to form one or more link aggregation groups for respective network devices;
   while the one or more link aggregation actors and partners are in the grace state, pacing, by the one or more link aggregation actors and partners, link aggregation formation on a plurality of links for the respective network devices by delaying formation of one or more new link aggregation groups for the plurality of links until a hold is released and periodically releasing the hold on a selected size of subsets of links for the plurality of links to support formation of one or more new link aggregation groups, the selected size of the subsets of links being increased or decreased in response to changes in severity of the stress condition;
   and exiting the grace state upon expiration of the grace period.

2. The method of claim 1, further comprising:
   while the one or more link aggregation actors and partners are in the grace state, maintaining one or more existing link aggregation groups with implicit keepalive signals that sustain the one or more existing link aggregation groups in lieu of receipt of periodic protocol data units (PDUs).

3. The method of claim 2, further comprising:
   checking one or more test conditions indicative of a control plane problem, and wherein the maintaining the one or more existing link aggregation groups with implicit keepalive signals is in response to the one or more test conditions being met.

4. The method of claim 3, wherein the one or more test conditions include receipt of an indication of a control plane restart or switchover.

5. The method of claim 3, wherein the one or more test conditions include receipt of one or more messages on a link for which periodic protocol data units (PDUs) are not being received.

6. The method of claim 3, wherein the one or more test conditions include overflow of a receiving queue.

7. The method of claim 1, further comprising:
   electing the network device or another network device at an opposing end of the plurality of links as a pacing master; and
   coordinating pacing by the pacing master through the transmission of one or more protocol data units (PDUs) on a subset of links on which the hold is to be released.

8. The method of claim 1 further comprising:
   determining the stress condition has eased; and
   changing a value of the grace period to provide an early exit to the grace state.

9. The method of claim 1 further comprising:
   determining the stress condition has not eased; and
   extending the grace period by an additional grace period.

10. The method of claim 1, wherein the one or more indicia of stress comprise an indication of processor starvation at the network device, a control plane restart or switchover at the network device, or a link aggregation restart at the network device.

11. The method of claim 1, wherein the causing further comprises: sending a protocol data units (PDU) that includes grace state information from a link aggregation actor to a link aggregation partner, the grace state information stored in one or more type-length-value elements.

12. The method of claim 1, wherein the network device is a switch that includes one or more one or more line cards and a processor.

13. An apparatus, comprising:
    one or more line cards that support a plurality of ports coupled to links;
    a processor coupled to the one or more line cards and configured to execute software processes;
    a link aggregation engine configured to logically aggregate links to form one or more link aggregation groups for a respective network device, each link aggregation group includes two or more of the links;
    a system state monitor configured to monitor for one or more indicia of stress at the apparatus, determine a stress exists, and generate a control signal;
    an aggregation grace state protocol engine configured to receive the control signal, and in response, trigger a grace state; and
    an adaptive aggregation pacing module configured to pace link aggregation formation on a plurality of links for the respective network device for the grace state by delaying formation of one or more new link aggregation groups for the plurality of links until a hold is released and periodically releasing the hold on a selected size of subsets of links of for the plurality of links to support formation of one or more new link aggregation groups, the selected size of the subsets of links being dependent upon changes in severity of the stress condition.

14. The apparatus of claim 13, further comprising:
    an adaptive aggregation pacing module configured to maintain one or more existing link aggregation groups with implicit keepalive signals that sustain the one or more existing link aggregation groups in lieu of receipt of periodic protocol data units (PDUs).

15. The apparatus of claim 14, wherein the adaptive aggregation pacing module is further configured to check one or more test conditions indicative of a control plane problem, and maintain the one or more existing link aggregation groups with implicit keepalive signals in response to the one or more test conditions being met.

16. A non-transitory computer-readable medium containing instructions and which when executed cause a computing device to:
- monitor for one or more indicia of stress;
- determine, based on the one or more indicia of stress, a stress condition exists;
- in response to the stress condition, cause one or more link aggregation actors and partners to enter a grace state for a grace period, the one or more link aggregation actors and partners logically aggregate links to form one or more link aggregation groups for respective network devices;
- while the one or more link aggregation actors and partners are in the grace state, pace link aggregation formation on a plurality of links by delaying formation of one or more new link aggregation groups on the plurality of links until a hold is released and periodically releasing the hold on a selected size of subsets of links for the plurality of links to support formation of one or more new link aggregation groups, the selected size of the subsets of links being increased or decreased in response to changes in severity of the stress condition; and
- exit the grace state upon expiration of the grace period.

* * * * *